United States Patent
Sreenivas et al.

(10) Patent No.: US 7,478,116 B2
(45) Date of Patent: Jan. 13, 2009

(54) MECHANISM TO EXCHANGE PRIMARY DATA STREAM OF A FILE

(75) Inventors: Mahesh K. Sreenivas, Sammamish, WA (US); Arkadi Brjazovski, Redmond, WA (US); Stefan R. Steiner, Sammamish, WA (US); Rohan Kumar, Redmond, WA (US); Sameet H. Agarwal, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 315 days.

(21) Appl. No.: 11/356,940

(22) Filed: Feb. 17, 2006

(65) Prior Publication Data

US 2007/0214190 A1 Sep. 13, 2007

(51) Int. Cl.
  *G06F 12/00* (2006.01)
(52) U.S. Cl. .......... 707/203; 707/10; 707/204; 709/201; 709/223; 709/225
(58) Field of Classification Search .......... None
See application file for complete search history.

(56) References Cited

U.S. PATENT DOCUMENTS

| | | | |
|---|---|---|---|
| 6,012,059 A | 1/2000 | Neimat | |
| 6,078,999 A | 6/2000 | Raju | |
| 6,289,356 B1 | 9/2001 | Hitz | |
| 6,370,531 B1* | 4/2002 | Boutcher et al. | 707/10 |
| 6,453,312 B1* | 9/2002 | Goiffon et al. | 707/3 |
| 6,574,591 B1 | 6/2003 | Hutchinson et al. | |
| 6,691,115 B2 | 2/2004 | Mosher, Jr. | |
| 6,704,733 B2* | 3/2004 | Clark et al. | 707/10 |
| 6,934,725 B1 | 8/2005 | Dings | |
| 7,016,910 B2* | 3/2006 | Egilsson et al. | 707/101 |
| 7,107,297 B2* | 9/2006 | Yellepeddy et al. | 707/204 |
| 7,191,192 B2* | 3/2007 | Yellepeddy et al. | 707/104.1 |
| 7,349,913 B2* | 3/2008 | Clark et al. | 707/101 |
| 7,401,104 B2* | 7/2008 | Shah et al. | 707/204 |
| 2003/0182330 A1 | 9/2003 | Manley | |
| 2005/0044089 A1* | 2/2005 | Wu et al. | 707/100 |
| 2005/0055380 A1* | 3/2005 | Thompson et al. | 707/200 |
| 2005/0125569 A1 | 6/2005 | Swindler | |
| 2005/0265162 A1 | 12/2005 | Tsubakihara | |
| 2007/0055703 A1* | 3/2007 | Zimran et al. | 707/200 |

\* cited by examiner

*Primary Examiner*—Pierre M Vital
*Assistant Examiner*—Loan T Nguyen
(74) *Attorney, Agent, or Firm*—Amin, Turocy & Calvin, LLP (57) ABSTRACT

A file stream exchange system and method are provided. The system can be employed, for example, with a storage system that supports transactions as a primary mechanism and employs a rich type system. The system provides a mechanism for the storage system to provide reliable updates to file streams while preserving the common criteria for security. The system includes a replace stream component which is a kernel mode mechanism that allows transactional exchange of stream data of two file-backed items without violating the common criteria for security.

16 Claims, 8 Drawing Sheets

MECHANISM TO EXCHANGE PRIMARY DATA STREAM OF A FILE

BACKGROUND

Traditionally, in a computer file system, a file is the basic unit of data storage. Typically, a file in a file system has the following characteristics. It is a single sequence of bytes. It has a finite length and is stored typically in a non-volatile storage medium. It is created in a directory and has a name that it can be referred to by in file operations, possibly in combination with its path. Additionally, a file system may associate other information with a file, such as permission bits or other file attributes; timestamps for file creation, last revision, and last access etc. Specific applications can also store domain-specific properties in the byte stream of the file. For example, files that are used by a word processing application and hence considered as 'documents' may store properties like the Title and Author of the document. These properties are stored within the byte stream of the file in a format that is specific to the application creating the file. The properties are not structured as objects, nor do they have standardized names. The byte streams are unstructured values.

Additionally, conventional computer file systems have provided limited file organization techniques available to users. For example, existing applications have largely adopted a tree structure folder format for organizing and displaying various types of files. Though some relationships between folders, subfolders, and files can be viewed, such relationships are limited in scope and are primarily dependent upon explicit user input. For example, files can be related according to their common folder or subfolder as denoted by the user.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A file stream exchange system and method are provided. The system can be employed, for example, with a storage system that supports transactions as a primary mechanism and employs a rich type system. A file-backed item (FBI) type is the equivalent of a file in conventional storage systems (e.g., NTFS). In order to support efficient streaming of unstructured data, for file-backed items, the storage system can store the stream data in files (e.g., NTFS files). These files can be named using unique identifiers (GUIDs) that are normally different from the actual namespace names of the file-backed items in the storage system. The mapping between a file-backed item and its corresponding file stream can be persisted, for example, in a table and/or cache. The system provides a mechanism for the storage system to provide reliable updates to file streams. The system further preserves the common criteria for security.

File backed item(s) whose stream is replaced (recipient item) can retain its ItemId as well as basic attribute(s). Optionally, client(s) (e.g., application(s)) can transact other operation(s) together with the replace stream operation. The replace stream operation is simple, efficient, robust and high-performing.

The system preserves common criteria for security (e.g., file owner/creator etc.). Significantly, client-side implementation of similar mechanisms usually runs the risk of failing to copy over security information especially when the owners of the two files (original file and modified file) involved are different. For example, many applications create a temporary file as part of a safe document update, that is, the application writes the new data to a temporary file, renames the original file to a different name, renames the temporary file to the original file name, and then deletes the old/original file. In this situation, when a file owned by USER1 is modified by USER2, the application will not always able to keep the original owner information intact. In such cases, the application may be forced to directly update the file (thus risking possible corruption during the update).

The system employs a unique way of remapping the file-streams associated with the file-backed items that eliminates the need for copying over basic attributes, security information and timestamps etc. with the exception of swapping of file sizes, for example, AllocationSize and StreamSize. Significantly, the system does not rename the files involved in the operation nor does the system rely on attribute tunneling to copy over any subset of attributes for the completion of the task. In a type rich storage system like the storage system where attributes and external data fragments associated with a file-backed item can be arbitrarily large in number as well in size the system is consistently superior in its efficiency.

The system includes a replace stream component which is a kernel mode (e.g., server-side) mechanism that allows transactional exchange of stream data of two files (e.g., file-backed items) in the storage system without violating the common criteria for security. The replace stream component provides a kernel-level infrastructure that allows user-mode processes to register, own, and manage UNC (Universal Naming Convention) namespaces. The replace stream component can facilitate the fast replacement of the primary data stream of a file-backed item (recipient item) with that of another given file-backed item (donor item) in the storage system. In one example, by default, the donor item is deleted as part of the replace stream operation.

The system further includes a file system agent that is a namespace owner (NSO). In one example, the file system agent is an internal user-mode component within the storage system engine that handles the file system requests to the UNC namespace owned by the storage system. A file system control (FSCTL) based approach can be employed, for example, for implementing the replace stream feature.

The file system agent and the replace stream component can have in-memory structures (e.g., table(s)) for file(s) opened in the storage system (e.g., maps namespace item identifiers with a globally unique identifier). The replace stream component can, for example, exchange a mapping of the namespace item identifier of the donor file backed item and the namespace item identifier of the recipient file backed item.

Significantly, the recipient file retains its basic attributes as they were before the replace stream was performed. This behavior applies to the donor item as well, if it is not deleted on close of the handle. In other words, the basic attributes are not swapped by the operation. In one example, the only exceptions to this rule are {StreamSize (EndOfFile), AllocationSize, LastModificationTime, LastAccessTime, and Archive property}. The items further retain their original values of ItemId.

To the accomplishment of the foregoing and related ends, certain illustrative aspects are described herein in connection with the following description and the annexed drawings. These aspects are indicative, however, of but a few of the various ways in which the principles of the claimed subject matter may be employed and the claimed subject matter is intended to include all such aspects and their equivalents.

Other advantages and novel features of the claimed subject matter may become apparent from the following detailed description when considered in conjunction with the drawings.

DETAILED DESCRIPTION

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

As used in this application, the terms "component," "handler," "model," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). Computer components can be stored, for example, on computer readable media including, but not limited to, an ASIC (application specific integrated circuit), CD (compact disc), DVD (digital video disk), ROM (read only memory), floppy disk, hard disk, EEPROM (electrically erasable programmable read only memory) and memory stick in accordance with the claimed subject matter.

Figure 1:
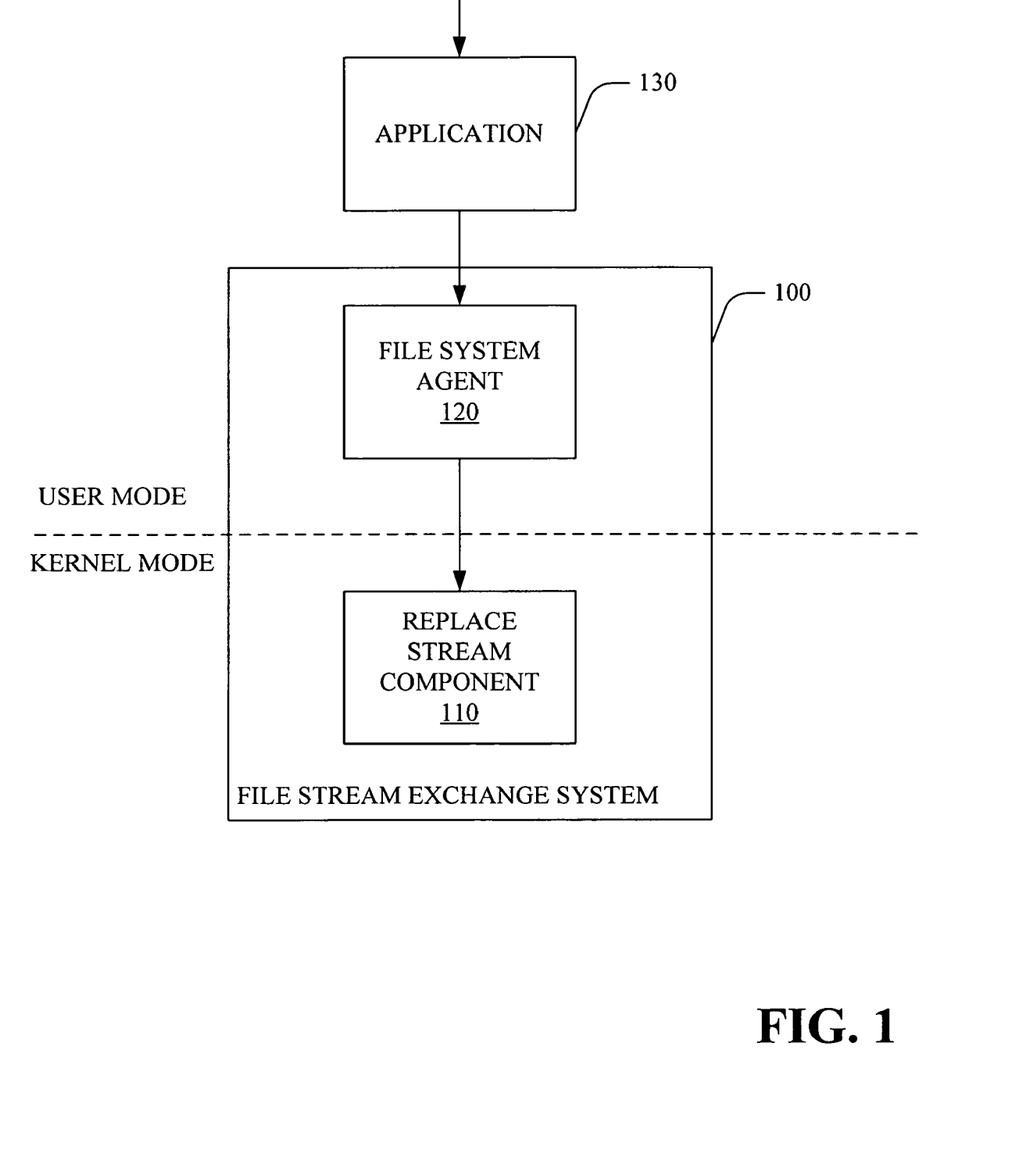
FIG. 1 is a block diagram of a file stream exchange system.
Figure 2:
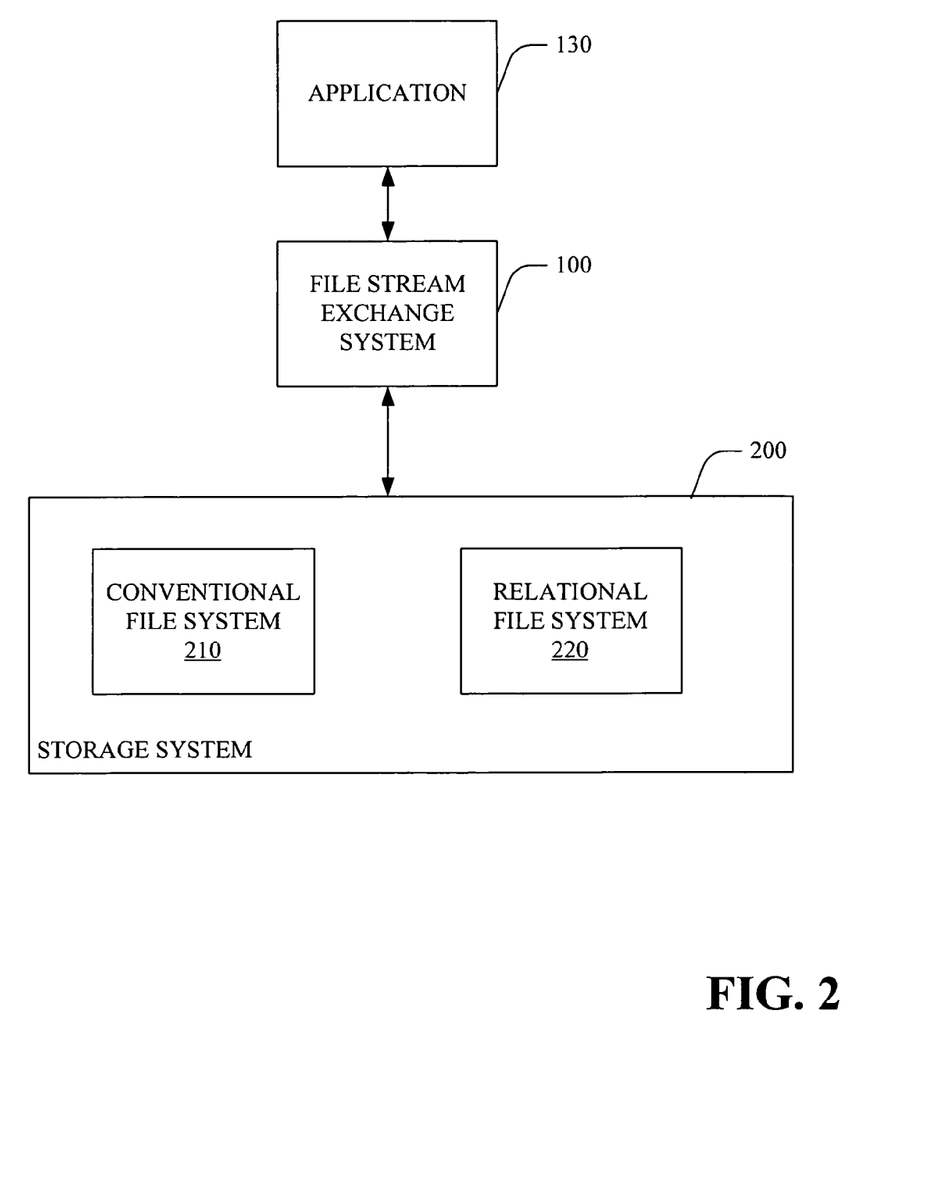
FIG. 2 is a block diagram of a file stream exchange system.

Referring to FIG. 1, a file stream exchange system 100 is illustrated. As illustrated in FIG. 2, the system 100 can be employed, for example, with a storage system 200 that supports transactions as a primary mechanism and employs a rich type system. In this example, a file-backed item (FBI) type in the equivalent of a file in conventional storage systems (e.g., NTFS) accessed via a conventional file system 210. In order to support efficient streaming of unstructured data, for file-backed items, the storage system 200 can store the stream data in files (e.g., NTFS files). These files are named using unique identifiers (GUIDs) that are normally different from the actual namespace names of the file-backed items in the storage system 200. The mapping between a file-backed item and its corresponding file stream can be persisted in a table, as discussed below. In the absence of transacted file system (TxF) support, the system 100 provides a mechanism for the storage system 200 to provide reliable updates to file streams. The system 100 further preserves the common criteria for security.

The replace stream feature of the system 100 can provide a mechanism to reliably update the primary data streams of file(s) in the absence of transacted file system (TxF) support. Additionally, file backed item(s) whose stream is replaced (recipient item) can retain its ItemId as well as basic attribute(s). Optionally, client(s) (e.g., application(s)) can transact other operation(s) together with the replace stream operation. The replace stream operation is simple, efficient, robust and high-performing.

As noted previously, the system 100 preserves common criteria for security (e.g., file owner/creator etc.). Significantly, client-side implementation of similar mechanisms usually runs the risk of failing to copy over security information especially when the owners of the two files (original file and modified file) involved are different. For example, many applications create a temporary file as part of a safe document update, that is, the application writes the new data to a temporary file, renames the original file to a different name, renames the temporary file to the original file name, and then deletes the old/original file. In this situation, when a file owned by USER1 is modified by USER2, the application will not always able to keep the original owner information intact. In such cases, the application may be forced to directly update the file (thus risking possible corruption during the update).

The system 100 employs a unique way of remapping the file-streams associated with the file-backed items that eliminates the need for copying over basic attributes, security information and timestamps etc. with the exception of swapping of file sizes, for example, AllocationSize and StreamSize. Significantly, the system 100 does not rename the files involved in the operation nor does the system 100 rely on attribute tunneling to copy over any subset of attributes for the completion of the task. In a type rich storage system like the storage system 200 where attributes and external data fragments associated with a file-backed item can be arbitrarily large in number as well in size the system 100 is consistently superior in its efficiency.

The system 100 includes a replace stream component 110 which is a kernel mode (e.g., server-side) mechanism that allows transactional exchange of stream data of two files (e.g., file-backed items) in the storage system 200 without violating the common criteria for security. The replace stream component 110 provides a kernel-level infrastructure that allows user-mode processes to register, own, and manage UNC (Universal Naming Convention) namespaces. The replace stream component 110 can facilitate the fast replacement of the primary data stream of a file-backed item (recipient item) with that of another given file-backed item (donor item) in the storage system 200. In one example, by default, the donor item is deleted as part of the replace stream operation.

The system 100 further includes a file system agent 120 that is a namespace owner (NSO). In one example, the file system agent 120 is an internal user-mode component within the storage system 200's engine that handles the file system requests to the UNC namespace owned by the storage system 200.

The file system agent 120 and the replace stream component 110 can have in-memory structures (e.g., table(s)) for file(s) opened in the storage system 200. In one example, a file system control (FSCTL) based approach is employed for implementing the replace stream feature. Additionally and/or alternatively, the replace stream feature can be implemented via a T-SQL stored procedure. However, for purposes of explanation, the FSCTL based approach will be discussed.

For example, assume that an application 130 desires to replace the primary data stream of file foo.txt (recipient file-backed item) with that of the replacement file (e.g., FBI) temp.txt (donor file-backed item). First, the application 130 opens the recipient file foo.txt in the exclusive file-sharing mode. If the open is successful, then the application 130 can send an FSCTL through the handle opened to file foo.txt. In the FSCTL, among other things, the application specifies the store system ItemID (e.g., GUID) of the donor file (e.g., temp.txt).

The FSCTL request fails if there are any open handles on temp.txt. Upon the completion of a successful FSCTL request for Replace Stream, the only subsequent operation supported on that open handle is CloseHandle( )/NtClose( ). By default, the donor item (temp.txt) gets deleted upon closing of the handle through which the FSCTL was sent. The user can also be given the ability to transact the Replace Stream operation along with other actions.

In one example, the replace stream functionality can involve the following steps. First, the application 130 opens the recipient file backed item (e.g., Foo.txt) in the exclusive file sharing mode (e.g., to block other user(s) from accessing the file during the replacement process). If this open is successful, the application 130 has a valid handle to the recipient file backed item (e.g., foo.txt).

As noted previously, optionally, the system 100 can support additional transaction support. In one example, if the application 130 requires to transact other operation(s) along with the replace stream operation, a transaction bind token can be passed through the EA (extended attribute) facility in NtCreateFile( ) API. Subsequent database operations performed on behalf of this handle use the bind token.

Next, the application 130 sends an FSCTL through the open handle to specify the application 130's intent to replace its primary stream with that of a donor file-backed item (e.g., temp.txt). The ItemID of the donor file-backed item is specified by the application 130 in the FSCTL. Note that, in this example, the application 130 explicitly opens only the recipient file. Accordingly, three different possibilities exist regarding the status of the donor file-backed item (e.g., temp.txt):

(1) There exist no open handle(s) on the donor file-backed item (e.g., temp.txt). This can be verified via the file system agent 120. In this scenario, the stream replace operation proceeds as discussed below.

(2) There exists one or more open handles (none of which are opened by the same application 130 that has initiated the replace stream operation) on the donor file-backed item (e.g., temp.txt). The check whether there exists any open handle(s) can be made via the file system agent 120. In this scenario, the system 100 returns an error to the application 130 and the stream replacement does not occur.

(3) There are open handle(s) on the donor file-backed item (e.g., temp.txt); however, all these handle(s) are opened by the same calling process (application 130) that has initiated the replace stream operation. In one example, the file system agent 120 is unable to confirm that all open handles to the donor file-backed item are owned by the same process. As such, the system 100 returns an error to the application 130 and the stream replacement does not occur.

The file system agent 120 can maintain a cache of item(s) for a variety of reasons. It is important to note that at least two different possibilities exist regarding the presence of a cache entry for the donor file-backed item in this case.

First, a cache entry exists for the donor file-backed item in the file system agent 120. If there are any open handles to this file, the system 100 can simply fail the FSCTL call, as described above. Otherwise, if the open, as discussed above, is transacted (a transaction bind token was supplied at the time of opening the handle) then the file system agent 120 can convert the cache entry into a transacted one. Second, a cache entry does not exist for the donor file-backed item in the file system agent 120. This implies there are no open handles to the donor file-backed item. Accordingly, the file system agent 120 can create appropriate cache entry(ies) for the donor file-backed item (e.g., temp.txt). If there are no open handles to the donor file-backed item, the application can invoke a helper method of the file system agent 120 to perform the replace stream operation.

Figure 3:
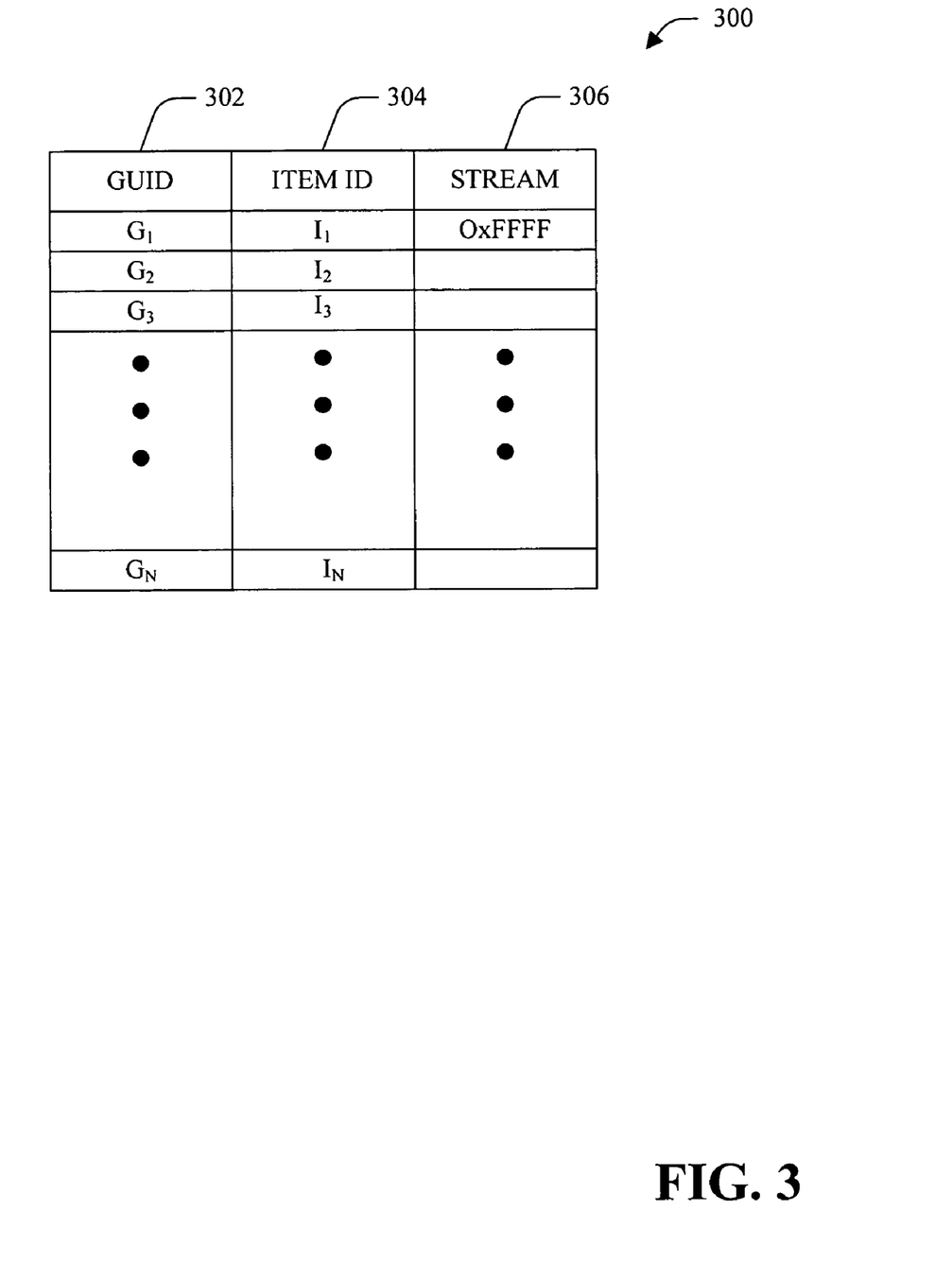
FIG. 3 is a diagram of a cache entry.

Referring briefly to FIG. 3, the replace stream component 110 can include a cache 300. A cache entry can include a GUID 302, an item ID 304 and an associated stream 306. Prior to invoking the store API (e.g., [FsaHelperNamespace].FsaReplaceStream) via the replace stream component 110, the file system agent 120 can flag its internal data structure (cache entries) to indicate that the recipient file backed item (e.g., foo.txt) and the donor file-backed item (e.g., temp.txt) are in the process of having their streams swapped. Between the time the call is made to the replace stream component 110 and the call is returned, any attempt to open the donor file-backed item (e.g., temp.txt) will fail with a sharing violation—the recipient file backed item cannot be opened at this time since the application 130 has an exclusive handle.

Figure 4:
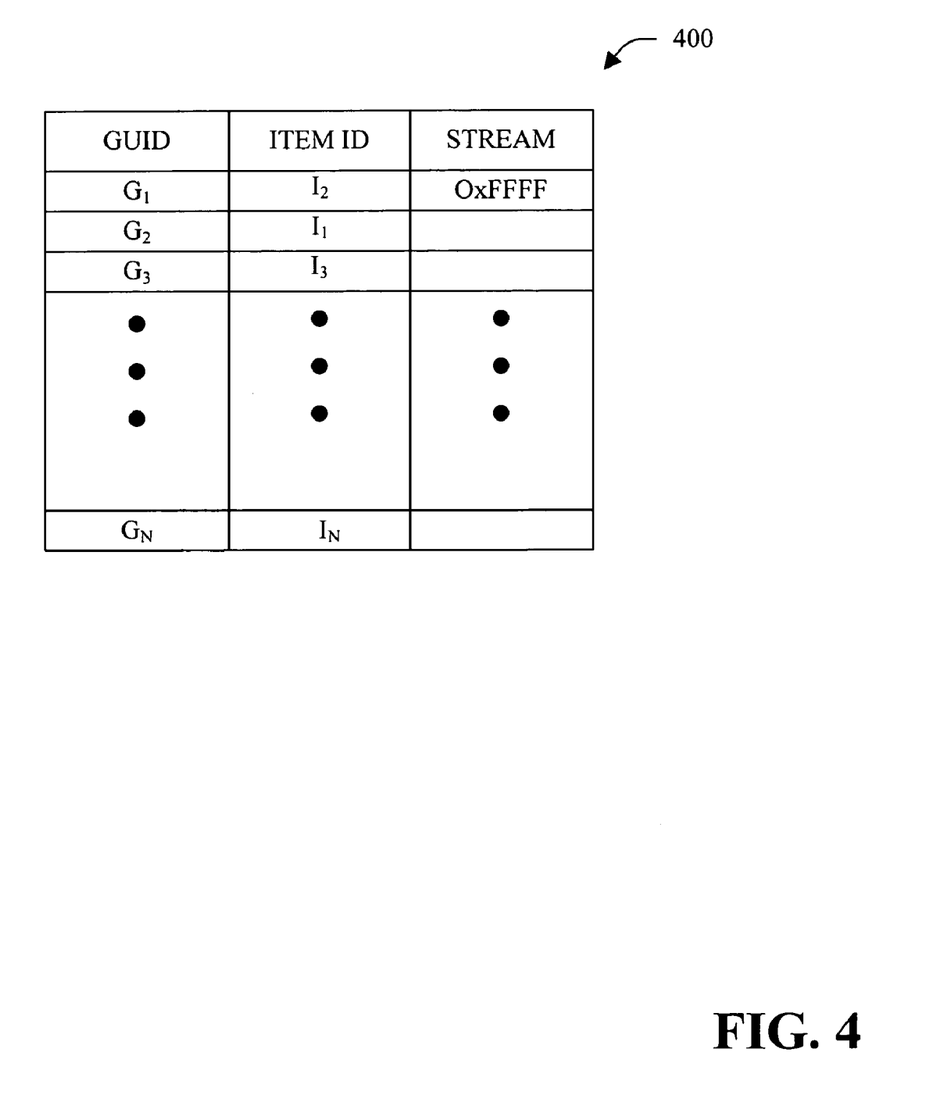
FIG. 4 is a diagram of a cache entry.

The replace stream component 110 (e.g., [FsaHelperNamespace].FsaReplaceStream procedure) can change the mappings between the two items and their streams, thus effectively achieving a fast switching operation. In addition to changing the mappings, the replace stream component 110 can also update {AllocationSize, StreamSize, LastModificationTime, LastAccessTime, and Archive property} values of the recipient and donor items. As illustrated in FIGS. 3 and 4, the mapping of I1 to G1 and $I_2$ to $G_2$ has been changed to $I_1$ mapped to $G_2$ and $I_2$ mapped to $G_1$.

Optionally, the replace stream component 110 can accepts a transaction bind token. If a transaction bind token is passed then it is used to bind to the transaction context prescribed by that bind token. If not, the replace stream component 110 can create its own transaction and commits it if the actions are successful.

Finally, in this example, if the operation(s) complete successfully, a close operation (e.g., NtClose( ) or Close Handle( )) is the only subsequent operation supported on the handle that was used to send the FSCTL for the replace stream operation. Additionally, by default the donor item is deleted during this NtClose( )/CloseHandle( ) operation. However, the application 130 can, optionally, instruct the system 100 not to delete the donor file-backed item on close of the handle, for example, by specifying the modifier flag FSA_FSCTL_REPLACE_STREAM_MODIFIER_DISABLE_DONOR_DELETE_ON_CLOSE in the FSCTL, thus effectively achieving swap-stream functionality.

When the application 130 supplies a transaction bind token during open, the application 130 is in control of the transaction, and hence is responsible for commit/rollback of that transaction. For transacted opens, the cache in the file system agent 120 is invalidated upon the close of the handle.

In this example, significantly, the recipient file retains its basic attributes as they were before the replace stream was performed. This behavior applies to the donor item as well, if it is not deleted on close of the handle. In other words, the basic attributes are not swapped by the operation. The only exceptions to this rule are {StreamSize (EndOfFile), AllocationSize, LastModificationTime, LastAccessTime, and Archive property}. Obviously, items retain their original values of ItemId. An application 130 has the ability to perform the replace stream operation without passing a transaction bind token in which case both the file-backed items involved must exist (committed) prior to the operation. The donor item can be created in the context of the transaction or could have been created outside of it. Also, memory mapped files are not affected by the swapping of the streams because the system cache is built on the GUID file names (names of the underlying conventional file system 210 (e.g., NTFS files)) and not on the UNC namespace names of the file-backed items in the storage system 200.

Continuing with this example, for security purposes, the application 130 (e.g., user) must have FILE_READ_DATA, FILE_READ_ATTRIBUTES, FILE_WRITE_DATA and FILE_WRITE_ATTRIBUTES permission on both the files (recipient and donor) involved in the replace stream operation. In addition, the application 130 (e.g., user) must have DELETE permission on the donor item. Upon receiving the replace stream FSCTL, FILE_WRITE_DATA and FILE_WRITE_ATTRIBUTES permissions on the recipient file-backed item are checked against the handle's granted access. In this example, all the required permissions, if any, on the donor file-backed item are evaluated against its security descriptor at the time of processing the FSCTL.

Optionally, the system 100 can support several behavior modification flags that allow user(s) to alter certain behavior mentioned above, for example:

FSA_FSCTL_OPENBYITEMID_MODIFIER_
NO_PROMOTION: If this flag is specified then a change record will not be queued for the recipient file-backed item. If specified together with FSA_FSCTL_REPLACE_STREAM_MODIFIER_DISABLE_DONOR_DELETE_ON_CLOSE then the semantics extends to donor item as well (e.g., no change record will be queued for the donor file-backed item).

FSA_FSCTL_OPENBYITEMID_MODIFIER_
NO_PROPERTY_UPDATE: Specifying this flag prevents the update of basic properties to the recipient item (which happens normally on the close of the handle). The scope of this semantics extends to the donor item as well, if this flag is specified together with FSA_FSCTL_REPLACE_STREAM_MODIFIER_DISABLE_DONOR_DELETE_ON_CLOSE.

FSA_FSCTL_OPENBYITEMID_MODIFIER_
NO_FILESTREAM_CHANGE_TRACKING: If this flag is specified, then the file stream change tracking info will not be updated for the recipient file-backed item. The semantics extends to the donor item as well, if this flag is specified together with FSA_FSCTL_REPLACE_STREAM_MODIFIER_DISABLE_DONOR_DELETE_ON_CLOSE.

FSA_FSCTL_REPLACE_STREAM_MODIFIER_
DISABLE_DONOR_DELETE_ON_CLOSE: Specifying this flag prevents the donor file-backed item from being deleted on close of the handle through which a replace stream FSCTL was successfully completed.

Figure 5:
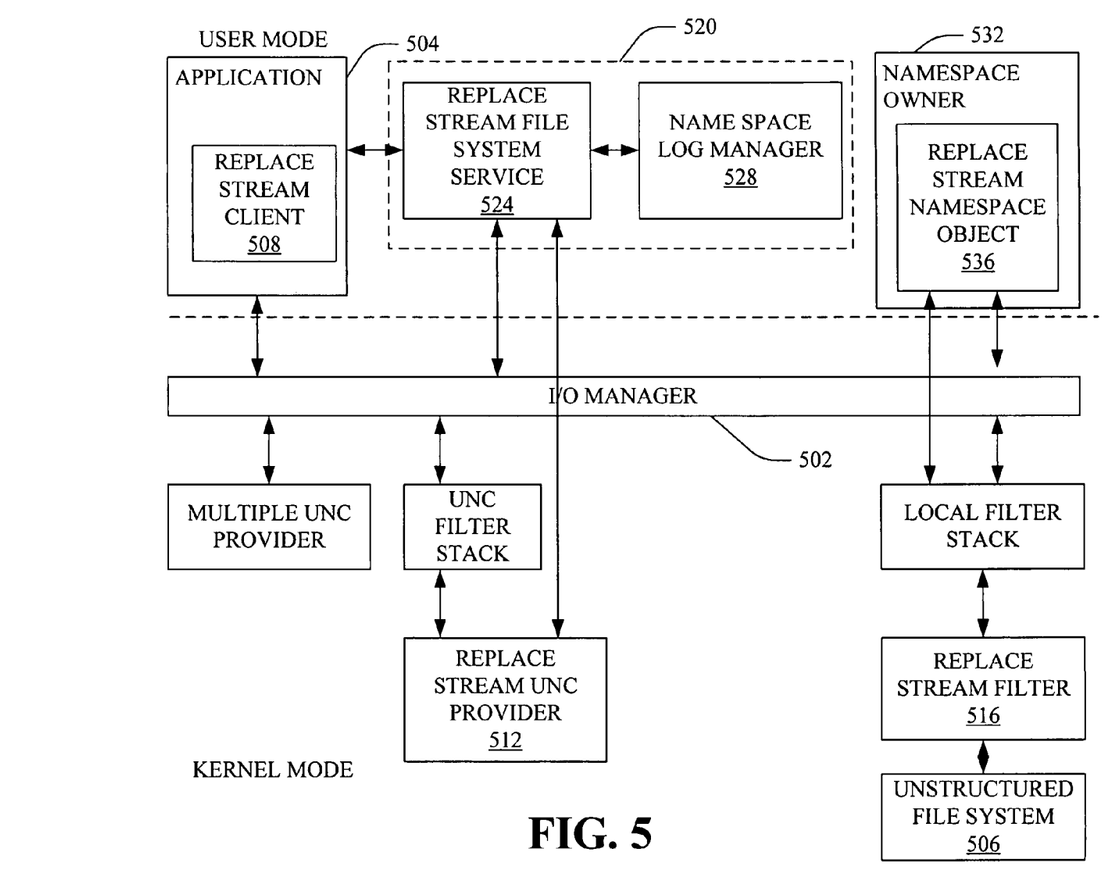
FIG. 5 is a block diagram of file a stream exchange system.

Referring next to FIG. 5, a file stream exchange system 500 is illustrated. The system 500 includes an I/O manager 502 which generally facilitates communication between user mode processes, such as an application 504, and kernel mode processes. The file stream exchange system 500 facilitates a replace stream feature that can provide a mechanism to reliably update the primary data streams of file(s) in an unstructured file system 506 in the absence of transacted file system (TxF) support. Additionally, file backed item(s) whose stream is replaced (recipient item) can retain its ItemId as well as basic attribute(s).

In this example, a replace stream component is distributed between the user mode and kernel mode and includes a replace stream client 508, a replace stream UNC provider 512 and a replace stream filter 516. Additionally, a file system agent 520 includes a replace stream file system service 524 and a name space log manager 528. The name space log manager 528 manages a namespace object 532 (e.g., owner by a storage system) and, more specifically, a replace stream namespace object 536.

An application 504 desiring to replace a primary data stream of a recipient file-backed item with that of a donor file-backed item first opens the recipient file-backed item in the exclusive file-sharing mode via the file system agent 520. If the open is successful, then application 504 can send an FSCTL through the handle opened to recipient file-backed item (including the ItemID of the donor file-backed item).

Via the name space log manager 528, the file system agent 520 flag its internal data structures (cache entries) to indicate that the recipient file-backed item and donor file-backed item are in the process of having their streams swapped. The file system agent 520 can the invoke the replace stream operation via the replace stream UNC provider 512 and the replace stream filter 516 which changes the mappings between the donor file-backed item and the recipient file back items and their streams, thus effectively achieving a fast switching operation.

It is to be appreciated that the system 100, the replace stream component 110, the file system agent 120, the application 130, the storage system 200, the conventional file system 210, the relational file system 220, the system 500, the I/O manager 502, the application 504, the unstructured file system 506, the replace stream client 508, the replace stream UNC provider 512, the replace stream filter 516, the file system agent 520, the replace stream file system service 524, the name space log manager 528, the namespace object 532 and/or the replace stream namespace object 536 can be computer components as that term is defined herein.

Figure 6:
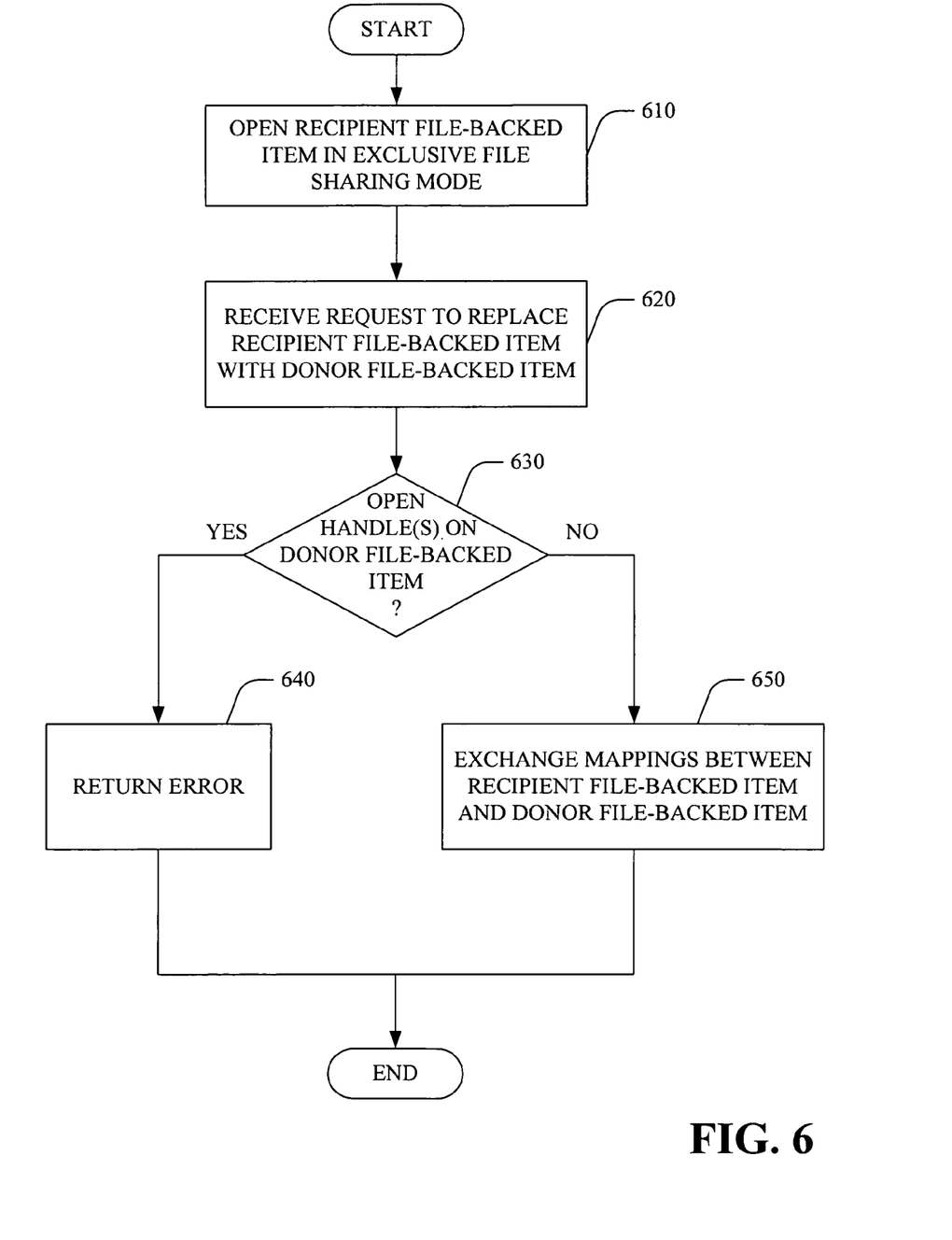
FIG. 6 is a flow chart of a file stream exchange method.

Turning briefly to FIG. 6, a methodology that may be implemented in accordance with the claimed subject matter are illustrated. While, for purposes of simplicity of explanation, the methodology is shown and described as a series of blocks, it is to be understood and appreciated that the claimed subject matter is not limited by the order of the blocks, as some blocks may, in accordance with the claimed subject matter, occur in different orders and/or concurrently with other blocks from that shown and described herein. Moreover, not all illustrated blocks may be required to implement the methodology.

The claimed subject matter may be described in the general context of computer-executable instructions, such as program modules, executed by one or more components. Generally, program modules include routines, programs, objects, data structures, etc. that perform particular tasks or implement particular abstract data types. Typically the functionality of the program modules may be combined or distributed as desired in various embodiments.

Referring to FIG. 6, a file stream exchange method 600 is illustrated. At 610, a recipient file-backed item is opened in exclusive file sharing mode (e.g., by an application). At 620, a request to replace the recipient file-backed item with a donor file-backed item is received (e.g., via an FSCTL).

At 630, a determination is made as to whether any open handle(s) exist on the donor file-backed item. If the determination at 630 is YES, at 640, an error is returned. If the determination at 630 is NO, a 650, mappings between the recipient file-backed item and the donor file-backed item are exchanged (e.g., swapped), for example, mappings of the namespace item identifiers.

Figure 7:
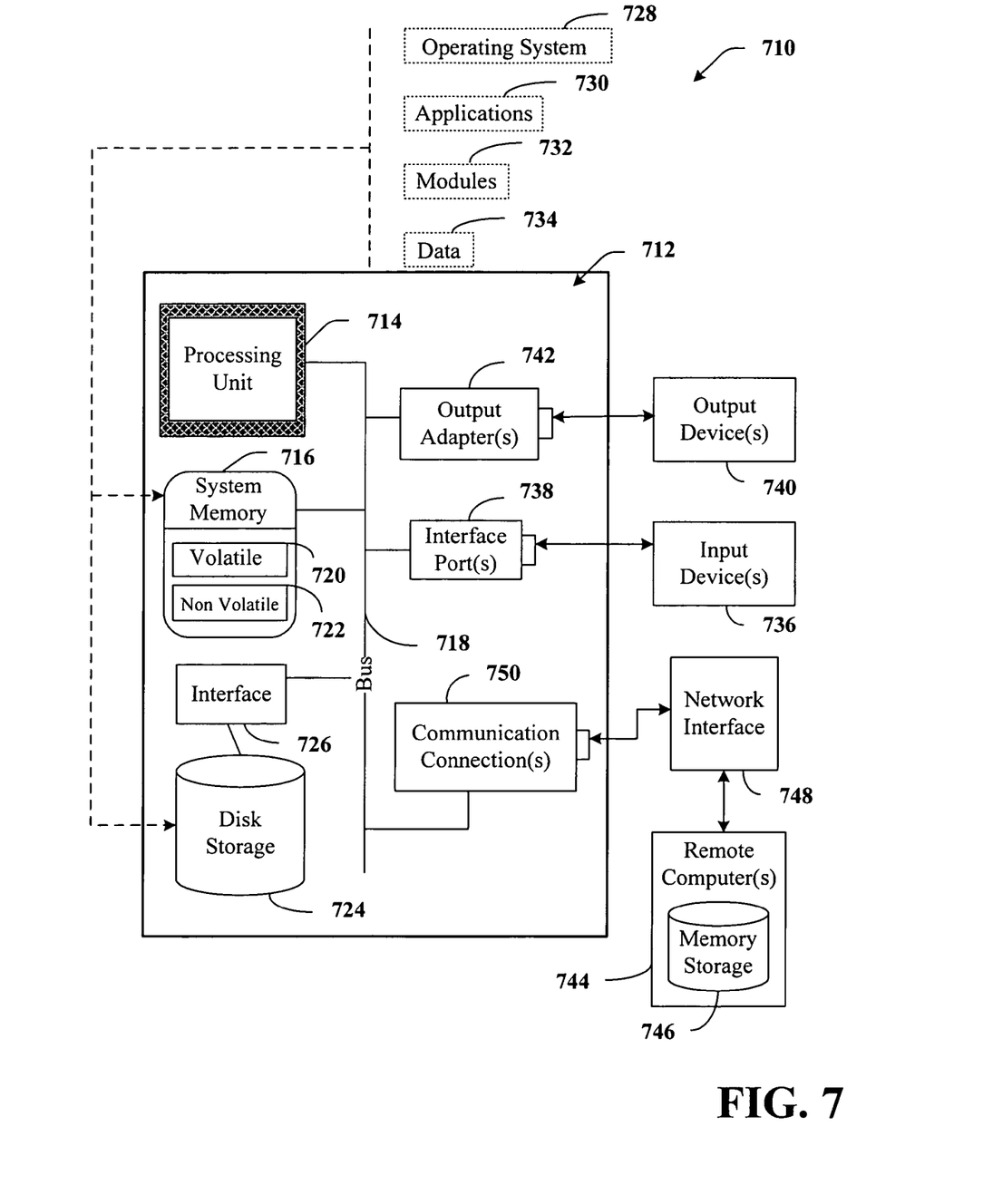
FIG. 7 illustrates an example operating environment.

In order to provide additional context for various aspects of the claimed subject matter, FIG. 7 and the following discussion are intended to provide a brief, general description of a suitable operating environment 710. While the claimed subject matter is described in the general context of computer-executable instructions, such as program modules, executed by one or more computers or other devices, those skilled in the art will recognize that the claimed subject matter can also be implemented in combination with other program modules and/or as a combination of hardware and software. Generally, however, program modules include routines, programs, objects, components, data structures, etc. that perform particular tasks or implement particular data types. The operating environment 710 is only one example of a suitable operating environment and is not intended to suggest any limitation as to the scope of use or functionality of the claimed subject matter. Other well known computer systems, environments, and/or configurations that may be suitable for use with the claimed subject matter include but are not limited to, personal computers, hand-held or laptop devices, multiprocessor systems, microprocessor-based systems, programmable consumer electronics, network PCs, minicomputers, mainframe computers, distributed computing environments that include the above systems or devices, and the like.

With reference to FIG. 7, an exemplary environment 710 includes a computer 712. The computer 712 includes a processing unit 714, a system memory 716, and a system bus 718. The system bus 718 couples system components including, but not limited to, the system memory 716 to the processing unit 714. The processing unit 714 can be any of various available processors. Dual microprocessors and other multiprocessor architectures also can be employed as the processing unit 714.

The system bus 718 can be any of several types of bus structure(s) including the memory bus or memory controller, a peripheral bus or external bus, and/or a local bus using any variety of available bus architectures including, but not limited to, an 8-bit bus, Industrial Standard Architecture (USA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 716 includes volatile memory 720 and nonvolatile memory 722. The basic input/output system (BIOS), containing the basic routines to transfer information between elements within the computer 712, such as during start-up, is stored in nonvolatile memory 722. By way of illustration, and not limitation, nonvolatile memory 722 can include read only memory (ROM), programmable ROM (PROM), electrically programmable ROM (EPROM), electrically erasable ROM (EEPROM), or flash memory. Volatile memory 720 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 712 also includes removable/nonremovable, volatile/nonvolatile computer storage media. FIG. 7 illustrates, for example a disk storage 724. Disk storage 724 includes, but is not limited to, devices like a magnetic disk drive, floppy disk drive, tape drive, Jaz drive, Zip drive, LS-100 drive, flash memory card, or memory stick. In addition, disk storage 724 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 724 to the system bus 718, a removable or non-removable interface is typically used such as interface 726.

It is to be appreciated that FIG. 7 describes software that acts as an intermediary between users and the basic computer resources described in suitable operating environment 710. Such software includes an operating system 728. Operating system 728, which can be stored on disk storage 724, acts to control and allocate resources of the computer system 712. System applications 730 take advantage of the management of resources by operating system 728 through program modules 732 and program data 734 stored either in system memory 716 or on disk storage 724. It is to be appreciated that the claimed subject matter can be implemented with various operating systems or combinations of operating systems.

A user enters commands or information into the computer 712 through input device(s) 736. Input devices 736 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 714 through the system bus 718 via interface port(s) 738. Interface port(s) 738 include, for example, a serial port, a parallel port, a game port, and a universal serial bus (USB). Output device(s) 740 use some of the same type of ports as input device(s) 736. Thus, for example, a USB port may be used to provide input to computer 712, and to output information from computer 712 to an output device 740. Output adapter 742 is provided to illustrate that there are some output devices 740 like monitors, speakers, and printers among other output devices 740 that require special adapters. The output adapters 742 include, by way of illustration and not limitation, video and sound cards that provide a means of connection between the output device 740 and the system bus 718. It should be noted that other devices and/or systems of devices provide both input and output capabilities such as remote computer(s) 744.

Computer 712 can operate in a networked environment using logical connections to one or more remote computers, such as remote computer(s) 744. The remote computer(s) 744 can be a personal computer, a server, a router, a network PC, a workstation, a microprocessor based appliance, a peer device or other common network node and the like, and typically includes many or all of the elements described relative to computer 712. For purposes of brevity, only a memory storage device 746 is illustrated with remote computer(s) 744. Remote computer(s) 744 is logically connected to computer 712 through a network interface 748 and then physically connected via communication connection 750. Network interface 748 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 750 refers to the hardware/software employed to connect the network interface 748 to the bus 718. While communication connection 750 is shown for illustrative clarity inside computer 712, it can also be external to computer 712. The hardware/software necessary for connection to the network interface 748 includes, for exemplary purposes only, internal and external technologies such as, modems including regular telephone grade modems, cable modems and DSL modems, ISDN adapters, and Ethernet cards.

Figure 8:
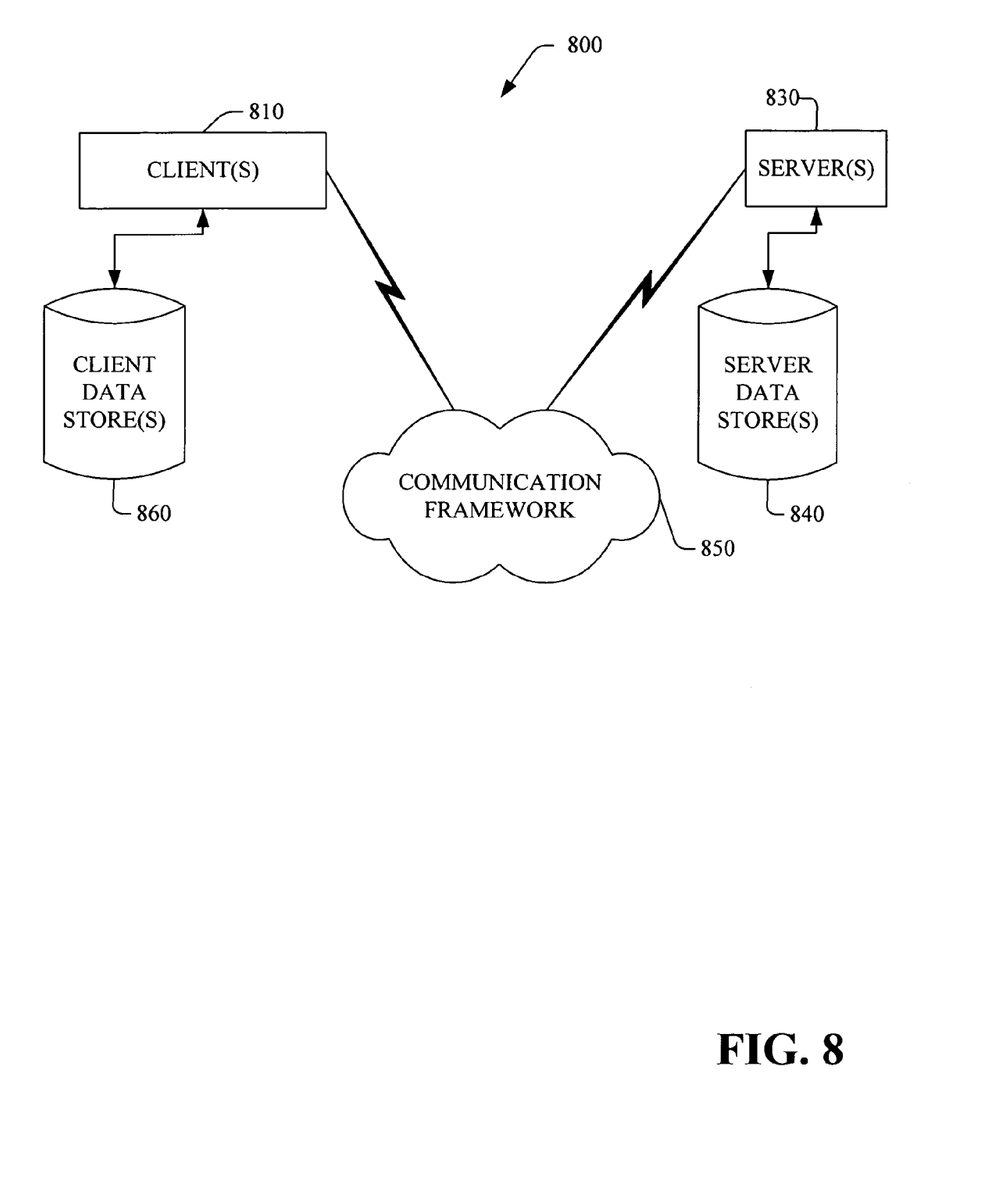
FIG. 8 is a schematic block diagram of a sample-computing environment.

FIG. 8 is a schematic block diagram of a sample-computing environment 800 with which the claimed subject matter can interact. The system 800 includes one or more client(s) 810. The client(s) 810 can be hardware and/or software (e.g., threads, processes, computing devices). The system 800 also includes one or more server(s) 820. The server(s) 820 can be hardware and/or software (e.g., threads, processes, computing devices). The servers 820 can house threads to perform transformations by employing the subject innovation, for example.

One possible communication between a client 810 and a server 820 can be in the form of a data packet adapted to be transmitted between two or more computer processes. The system 800 includes a communication framework 840 that can be employed to facilitate communications between the client(s) 810 and the server(s) 820. The client(s) 810 are operably connected to one or more client data store(s) 850 that can be employed to store information local to the client(s) 810. Similarly, the server(s) 820 are operably connected to one or more server data store(s) 930 that can be employed to store information local to the servers 920.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A file stream exchange system, comprising:

a processor a file system agent coupled to said processor that is a user mode component that allows exchange of a recipient file backed item and a donor file backed item, if no open handles on the donor file backed item exist; and, a replace stream component that is a kernel mode component that swaps mapping of the recipient file backed item with the donor file backed item without violating common criteria for security, the replace stream component provides a kernel-level infrastructure that allows user-made processes to register, own, and manage Universal Naming Convention (UNC) namespaces;

wherein the replace stream component accepts a transaction bind token, and if the transaction bind token is passed then the replace stream component is used to bind to a transaction context prescribed by that bind token, if not, the replace stream component creates a own transaction and commits the transaction if actions are successful; and wherein the donor file backed item is not deleted on close of the handle, and the recipient file backed item and donor file backed item retain basic attributes and the basic attributes are not swapped by the system.

2. The system of claim 1, the file system agent manages file system requests to a namespace owned by a storage system.

3. The system of claim 1, the file system agent comprises an in-memory structure associated with file(s) opened in a storage system.

4. The system of claim 1, the replace stream component comprises an in-memory structure that maps namespace item identifiers with a globally unique identifier.

5. The system of claim 4, the replace stream component exchanges a mapping of the namespace item identifier of the donor file backed item and the namespace item identifier of the recipient file backed item.

6. The system of claim 1, the replace stream component comprises a T-SQL stored procedure.

7. The system of claim 1, an application invoked the file stream exchange via a file system control directive.

8. The system of claim 1, the file system agent does not allow access to the donor file-backed item during the file stream exchange.

9. The system of claim 1, the file system agent provides an error indication if an open handle on the donor file backed item exists.

10. The system of claim 1, the replace stream component further updates at least one of AllocationSize, StreamSize, LastModificationTime, LastAccessTime, and Archive property values of the recipient file-backed item.

11. The system of claim 1, the replace stream component further updates at least one of AllocationSize, StreamSize, LastModificationTime, LastAccessTime, and Archive property values of the donor file-backed item.

12. The system of claim 1, at least one of the StreamSize (EndOfFile), AllocationSize, LastModificationTime, LastAccessTime, and Archive properties of the recipient file-backed item is modified during the file stream exchange.

13. A file stream exchange method, comprising:

receiving a request to replace a recipient file-backed item with a donor file-backed item;

determining whether there are any open handles on the donor file-backed item;

exchanging mappings between the recipient file-backed item and the donor file-back item without violating common criteria for security;

accepting a transaction bind token, if the transaction bind token is passed then a replace stream component is used to bind to a transaction context prescribed by that bind token, if not, the replace stream component creates a transaction and commits the transaction if actions are successful; and wherein the donor file-backed item is not deleted on close of the handle, and the recipient file-backed item and donor file-backed item retain basic attributes and the basic attributes are not swapped by the system.

14. The method of claim 13, exchanging mappings further comprising exchanging namespace item identifier mappings between the recipient file-backed item and the donor file back item.

15. A file stream exchange system, comprising:

a processor:

means for determining whether an open handle on a donor file-backed item exists;

means for exchanging mappings of a recipient file-backed item and the donor file-backed item, if no open handle exists on the donor file-backed item without violating common criteria for security;

means for accepting a transaction bind token, if the transaction bind token is passed then a replace stream component is used to bind to a transaction context prescribed by that bind token, if not, the replace stream component creates a transaction and commits the transaction if actions are successful; and wherein the donor file-backed item is not deleted on close of the handle, and the recipient file-backed item and donor file-backed item retain basic attributes and the basic attributes are not swapped by the system.

16. The system of claim 15, the means for exchanging exchanges a mapping of the namespace item identifier of the donor file backed item and the namespace item identifier of the recipient file backed item.

* * * * *